F. SCHMIDT & C. FREMAUX.
MACHINE FOR COMBING FIBROUS MATERIALS.
APPLICATION FILED FEB. 19, 1908.

948,665.

Patented Feb. 8, 1910.

INVENTORS:
FRANZ SCHMIDT & CHARLES FREMAUX,

F. SCHMIDT & C. FREMAUX.
MACHINE FOR COMBING FIBROUS MATERIALS.
APPLICATION FILED FEB. 19, 1908.
948,665.
Patented Feb. 8, 1910.
4 SHEETS—SHEET 2.
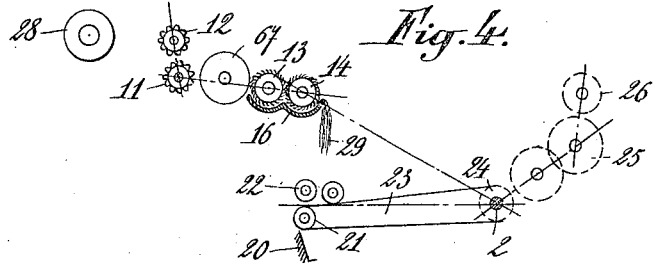
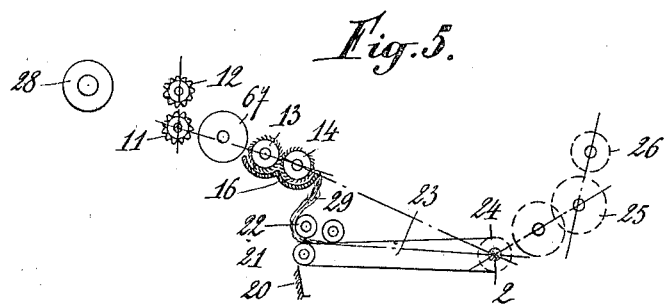
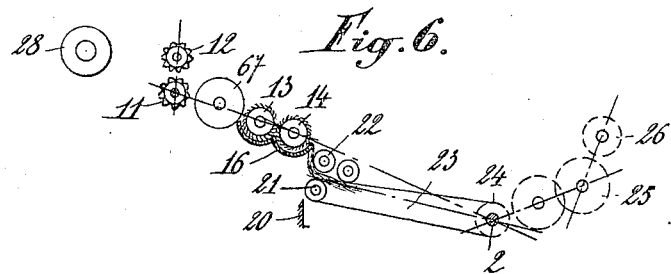
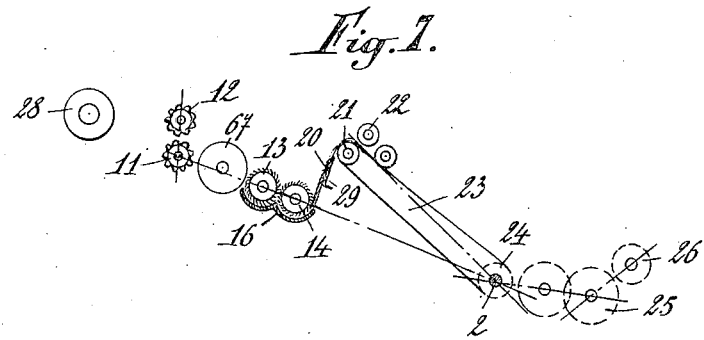
WITNESSES:
Waldo M Chapin
William L Lary
INVENTORS:
FRANZ SCHMIDT & CHARLES FREMAUX,
BY THEIR ATTORNEYS
Rosenbaum & Stockbridge F. SCHMIDT & C. FREMAUX.
MACHINE FOR COMBING FIBROUS MATERIALS.
APPLICATION FILED FEB. 19, 1908.
948,665.
Patented Feb. 8, 1910.
4 SHEETS—SHEET 3.
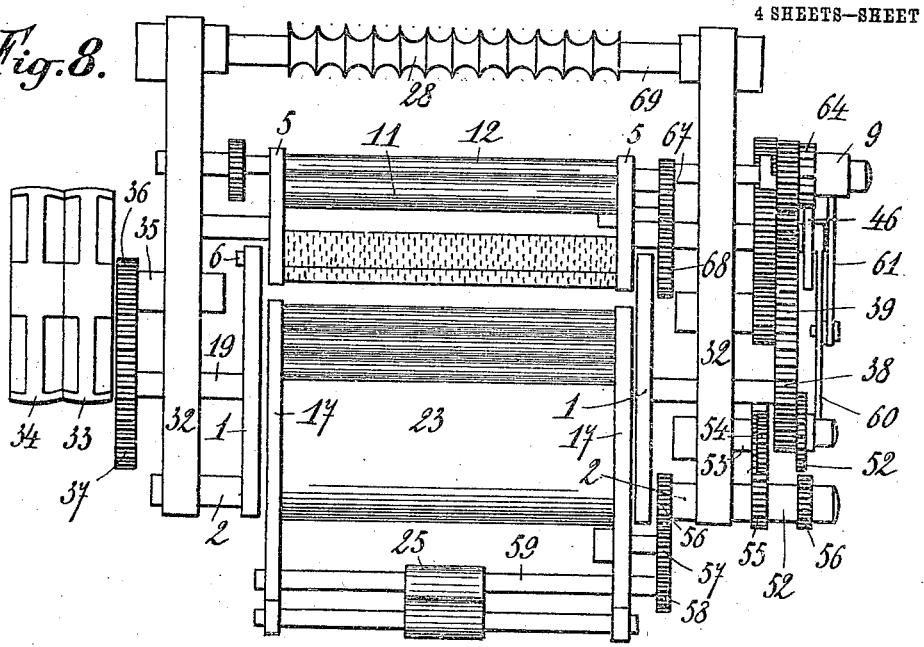
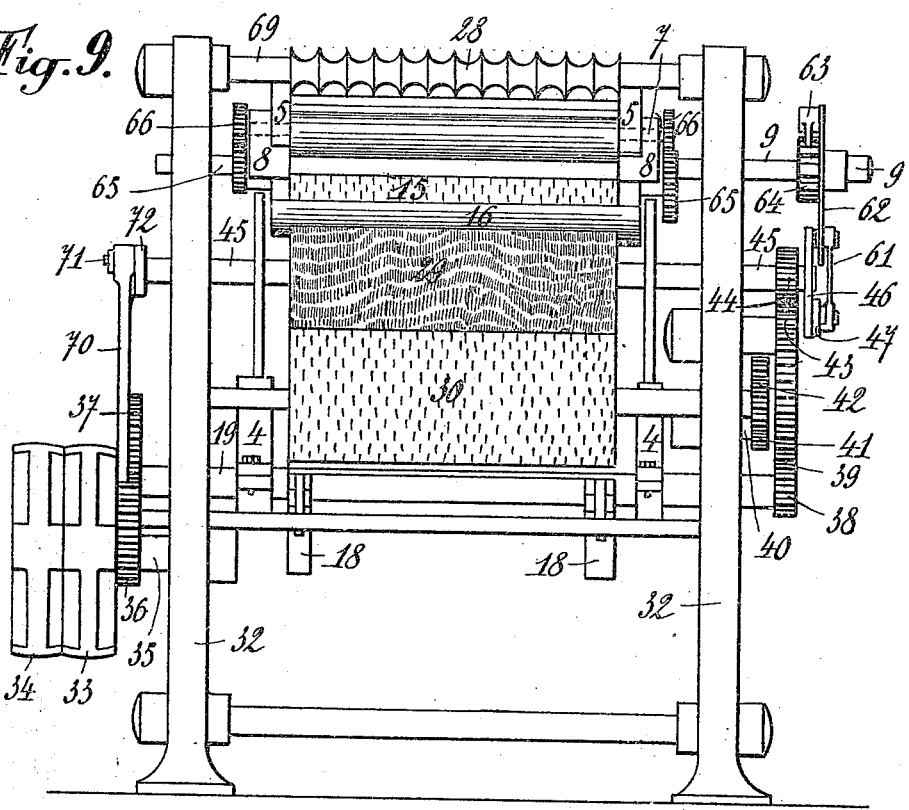
WITNESSES:
Waldo M Chapin
William C. Lary
INVENTORS:
FRANZ SCHMIDT & CHARLES FREMAUX,
BY THEIR ATTORNEYS
Rosenbaum & Stockbridge

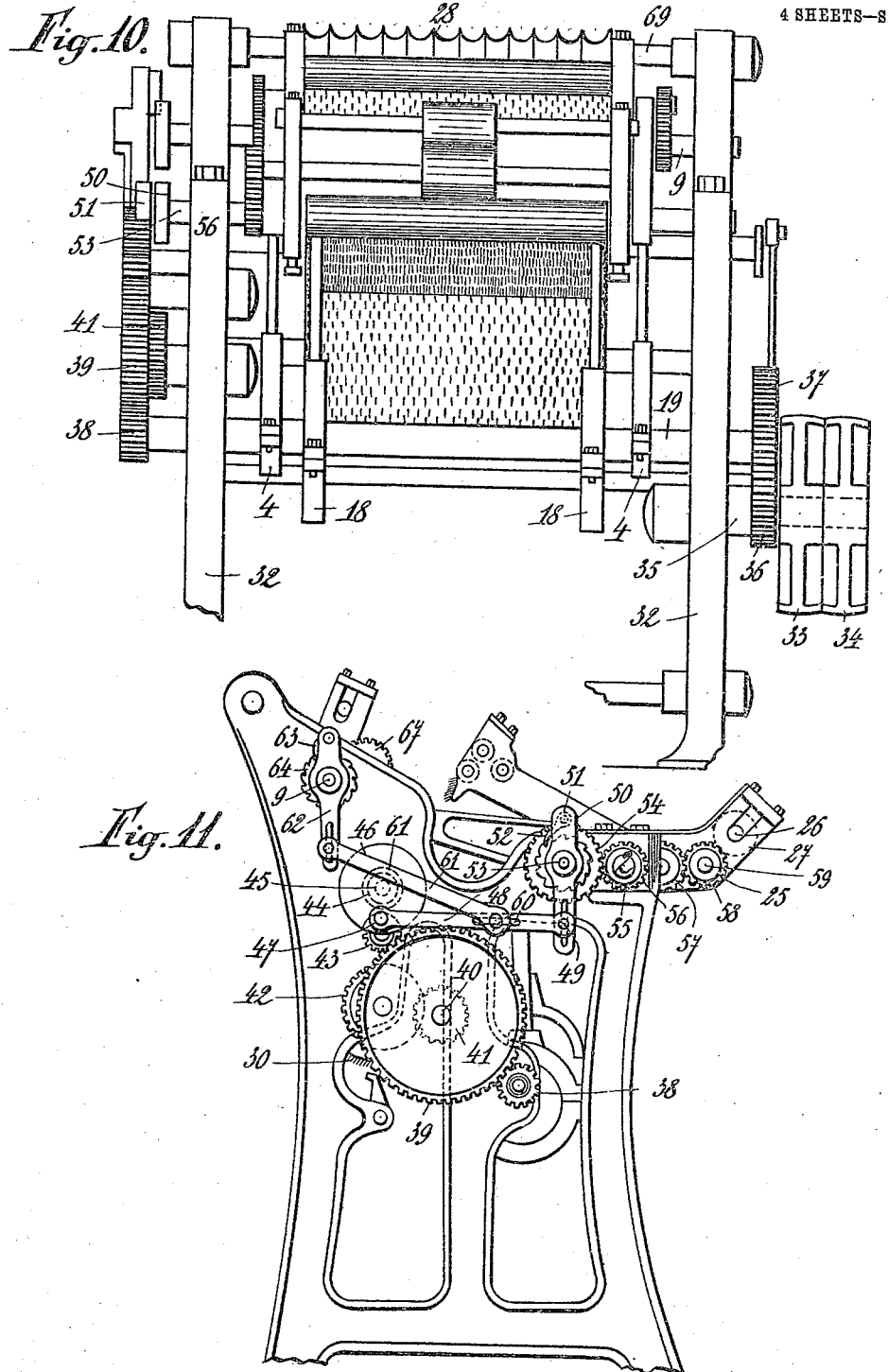

UNITED STATES PATENT OFFICE.

FRANZ SCHMIDT AND CHARLES FREMAUX, OF ROEULX, BELGIUM.

MACHINE FOR COMBING FIBROUS MATERIALS.

948,665.  Specification of Letters Patent.  Patented Feb. 8, 1910.

Application filed February 19, 1908. Serial No. 416,638.

*To all whom it may concern:*

Be it known that we, FRANZ SCHMIDT, engineer, a subject of the King of Belgium, and CHARLES FREMAUX, foreman, a citizen of France, both residing at Roeulx, in the Kingdom of Belgium, have invented new and useful Improvements in Machines for Combing Fibrous Materials, of which the following is a specification.

Combing machines for fibrous materials as at present known may be arranged in two principal classes, as regards their mode of action, viz., firstly round combing machines with annular combs and secondly rectilinear intermittent combing machines having cylinders provided with smooth segments and covered with pins. These machines generally possess great disadvantages among which may be mentioned insufficiency and irregularity of feed, inefficient support of the fibers during the combing and pulling, the obtaining of imperfectly combed products and of by-products of inferior quality and more especially the impossibility of adapting the machine, by simply regulating it, for the combing of different materials of various lengths such as wool, cotton, silk-waste, flax-hards etc.

The object of our invention is to produce a combing machine which is free from these disadvantages and is particularly distinguished from known combing machines in that it can be adapted to the treatment of material of any length by simply varying the arrangement of the parts.

With this object in view our invention consists in the special arrangement and combination of parts as hereinafter fully described and pointed out in the appended claims.

Figure 1:
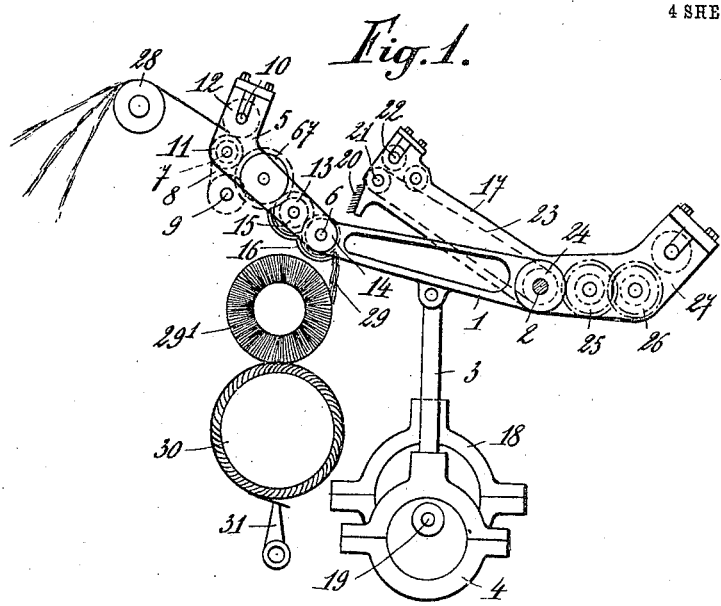
Figure 2:
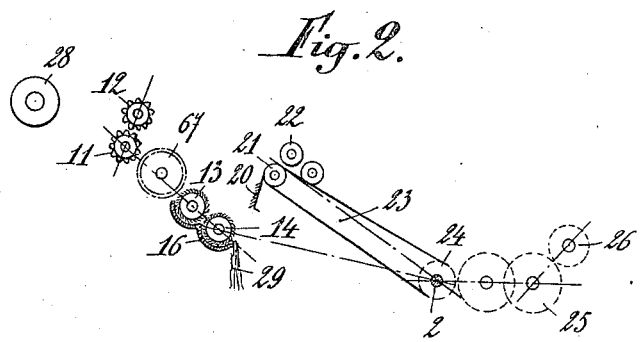
Figure 3:
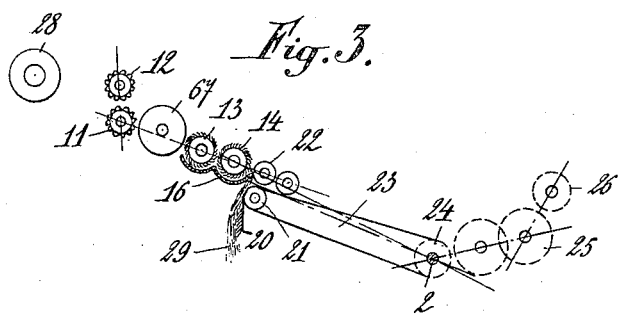

In the annexed drawings: Figures 1 to 7 diagrammatically illustrate, as an example, one way of carrying out our invention. Fig. 1 shows the principal parts of the machine. Fig. 2 shows diagrammatically the position of the parts at the moment when a feed takes place and when the two groups of parts are about to begin their opposite angular movements. Fig. 3 shows the position of the parts when combing a sliver. Fig. 4 shows the position of the parts after combing the sliver and when they have arrived at the end of their travel. Fig. 5 shows the position of the parts at the commencement of the pulling of the combed sliver. Fig. 6 shows the position of the same parts during the pulling, and Fig. 7 shows their position at the end of this operation. Figs. 8, 9, 10 and 11 show, by way of example, a practical arrangement of the machine. Fig. 8 is a plan view of the entire machine, Fig. 9 is a rear elevation, Fig. 10 is a front elevation, and Fig. 11 is a side elevation of the same.

As shown in Fig. 1 the feed mechanism of the machine comprises two beams 1 separated from each other a distance according to the width of the machine and oscillating upon a shaft 2 under the action of connecting rods 3 driven by eccentrics 4 mounted upon a common driving shaft. At the end of the two beams 1 are jointed two brackets 5 adapted to pivot upon a shaft 6. These brackets 5 are themselves jointed through the medium of a pivot 7 to two cranks 8 arranged to pivot upon a shaft 9 carried between the frame of the machine. The brackets 5 carry between them upon the pivot 7 and upon a shaft 10 two grooved feed rollers 11 and 12 receiving an intermittent rotary movement through a suitable mechanism and transmitting their movement by suitable pinions to two feed rollers 13 and 14 one of which is carried by a spindle 15 between the bracket plates 5 and the other by the spindle 6 by which the bracket plates 5 are hinged to the end of the beam 1. It will be easily understood by reference to the diagrams, Figs. 2 to 7, that owing to the described construction the feed roller 14 can, under the action of the eccentrics 4, describe, with the beam 5, an angular movement around the shaft 2 while remaining fixed to the feed roller 13 and to the grooved rollers 11 and 12 which can occupy different positions owing to the oscillation of the cranks 8 upon the shaft 9. The feed rollers 13 and 14, are furnished with pins pointed in an opposite direction to the direction of rotation of the said rollers, and coöperate with a plate 16 extending the whole length of the said rollers between the brackets 5 and brought as close as possible to the periphery of the rollers so as to compel the whole sliver or fleece passing between the said plate and the rollers to enter deeply between the pins or points covering the feed roller 14; this plate follows the shape of the periphery of the roller 14 so as to bring the sliver almost tangential to the roller 14 when it is in its top position, that is to say, when the axes of the rollers 13 and 14 are nearly in the same horizontal plane.

The combing and pulling devices are mounted between two beams 17 arranged between the beams 1 and actuated by eccentrics 18 operated by the same shaft 19 as the eccentrics 4 controlling the feed mechanism. The combing device consists of a comb 20 in the form of an arc of a circle concentric with the shaft 2 and is arranged between the two beams 17 beneath two pulling cylinders 21 and 22 having large grooves or channels coöperating with an endless apron 23 passing over a roller 24 keyed on the shaft 2. This endless apron is set traveling at a certain moment by suitable driving mechanism which causes the shaft 2 to rotate and coöperates with two drawing cylinders 25 and 26 mounted between arms 27 forming an extension of the beams 17 beyond the shaft 2.

From these explanations it will be easy to understand the operation and method of working of a machine comprising the principal parts which have just been described. As will be understood by reference to Fig. 1 the two eccentrics 4 and 18 actuated by the shaft 19 communicate to the beams 1 and 17 alternate angular movements in opposite directions, that is to say, one of the sets of beams 1, for example, is lowered while the other set 17 rises. When the set of beams 1 has arrived at the end of its travel (Fig. 2) the feed rollers 11, 12, 13 and 14 effect a rotation under the action of their drive and cause the advance of the fleece (brought over guide rollers 28) between the channeled rollers 11 and 12 and between the rollers 13 and 14 furnished with pins or points so that the sliver 29 which is to be combed hangs at this moment, as shown in Fig. 2, while remaining held between the pins of the roller 14 by the tail of the sliver clamped between these pins and the plate 16. At this moment the beams 1 commence their upward travel while the beams 17 commence their downward travel until the moment when the parts arrive at the respective positions shown in Fig. 3 in which the comb 20 combs the head of the sliver 29. The parts then finish by reaching the position represented in Fig. 4 in which the beams 1 with the feed rollers 13 and 14 have arrived at their uppermost position while the beams 17 have arrived at their lowermost position in which the comb 20 is presented to the action of a brush 29' (Fig. 1) which frees it from the by-products which are removed by a clearing roller 30 and a doffing comb 31. The beams 1 and 17 then commence their opposite angular movements, the beams 1 performing their downward travel with the feed devices while the beams 17 begin their upward travel with the combing and pulling devices. At this moment the endless apron 23 as well as the pulling rollers 21 and 22 and the drawing rollers 25 and 26 are rotated by their drive so that the pulling cylinders 21 and 22 can seize and absorb the head of sliver 29 which has just been combed. The pullers commence by drawing along the longest fibers and afterward the shortest in order to carry them by means of the endless apron 23 to the drawing rollers 25 and 26 which deliver the treated material. As the beams 17 follow their upward movement while the beams 1 continue their downward movement there is a time when the pulling rollers occupy a higher position than the feed rollers 13, 14 (Fig. 7). At this moment the pulling rollers drawing the sliver cause the combing of the remaining part by the pins pointed toward the bottom of the feed roller 14 so that the tail of the sliver is also perfectly combed by the feed roller 14 and is freed from all lumps or knots. During this phase of the operation the feed rollers 13 and 14 have arrived at the end of their downward travel and give place to a fresh feed thus presenting a new head of sliver (Fig. 2) which will be combed during the following upward movement of the feed rollers and simultaneous descent of the comb 20. This comb in its descent and on its passage tangentially to the feed roller 14 will remove from the pins or points of this roller the lumps or knots left by the tail of sliver pulled and combed in the preceding operation.

It will be easily seen that owing to the coöperation of the two opposite angular movements of the beams 1 and 17 the machine can be easily regulated for the treatment of any length of material; it is only necessary to alter the play of these beams by simply replacing the eccentrics 4 and 18 in order to vary the extent of the angular movements and consequently the duration of action of the comb 20 on the length of sliver which hangs vertically over the edge of the plate 16 of the feed roller 14. Independently of this result the described machine possesses the advantage of insuring a continuous feed without ever slackening the slivers of materials to be combed which are always held by the pins or points of the roller 14 coöperating with the plate 16; this particularly important result as regards the feed is obtained without necessitating a recourse to nippers, combs or other accessory devices such as have hitherto been employed.

In Figs. 8, 9, 10 and 11 the parts hereinbefore mentioned are designated by the same numerals so that it is only necessary to briefly indicate the combined arrangement of actuating devices. The machine comprises two lateral frames 32 and is actuated by a driving pulley 33 with a loose pulley 34 mounted upon a trunnion 35. The driving pulley 33 is coupled with a pinion 36 actuating through the medium of a pinion 37 the shaft 19 already mentioned on which are mounted the two groups of eccentrics 4 and 18. The shaft 19 carries at its end opposite to the pinion 37 a pinion 38 actuating a large toothed wheel 39 mounted upon a trunnion 40 and coupled with a pinion 41 actuating a pinion 42 mounted upon the shaft of the stripping roller 30. The pinion 39, moreover, operates a pinion 43 which is mounted upon a trunnion fixed to the frame and which serves as an intermediate pinion for actuating a pinion 44 upon the shaft 45 of the brush $29^1$. On this shaft 45 and on the outside of the pinion 44 is mounted a disk 46, Fig. 11, on which is fixed a pin 47 serving as a point of attachment for a rod 48 connected at its other end to a guide slot 49 in an oscillating lever 50, Fig. 11. This lever carries a pawl 51 taking into a ratchet wheel 52 mounted upon a pivot 53 and coupled to a pinion 54 actuating a pinion 55 mounted upon the shaft 2 on which freely oscillate the beams 1 and 17. On this shaft is also mounted within the frame a pinion 56 actuating an intermediate pinion 57, Fig. 8, operating through a pinion 58 the spindle 59 of the drawing roller 25 which operates the second roller 26 by friction. To the connecting rod 48 is attached an adjusting guide-slot 60 a connecting rod 61 actuating an oscillating lever 62 pivoting upon the shaft 9 on which oscillate the cranks 8 supporting the feed mechanism. The lever 62 is provided with a pawl 63 engaging in the teeth of a ratchet wheel 64 keyed upon the shaft 9 which carries pinions 65 driving pinions 66 mounted upon the ends of the shaft 7 carrying the channeled feed roller 11. One of these pinions 66 actuates through an intermediate pinion 67 the pinion 68 driving the feed rollers 13 and 14. The guide rollers 28 by which the material is brought to the machine are mounted upon a transverse shaft 69 uniting the lateral frames 32 at the upper part. The doffing comb 31 is actuated by a rod 70 connected by a crank pin 71 to a disk 72 keyed upon the outer end of the shaft 45 of the brush $29^1$.

The operation of the machine thus constructed will be evident in the light of the description hereinbefore given of the operations, proper of combing and pulling. The rotation of the shaft 19 through the medium of the drive 37, 36, 33 has for effect to communicate the required oscillating movements to the beams 1 and 17; simultaneously the stripper 30 is rotated by the pinions 38, 39, 41 and 42 and the brush $29^1$ by the pinions 38, 39, 43, 44. The disk 46 communicates through the connecting rod 48 and through the connecting rod 61 intermittent oscillating movements to the rocking levers 50 and 62 which, through their respective pawls, actuate the driving pinions of the endless apron 23 on the one hand and of the coöperating mechanisms on the other hand of the channeled rollers 11 and 12 of the feed mechanism.

The described construction is particularly strong, comprises no delicate movements and is free from cams or springs thus greatly assisting the successful working of the machine.

Having thus described our invention what we claim is—

1. In a combing machine, a feed mechanism, a combing device, a pulling device, and a single supporting part having a predetermined to and fro movement and carrying the combing and pulling devices.

2. In a combing machine, a feed mechanism, a combing device and a pulling device, and a single supporting part having a to and fro movement and carrying the combing and pulling devices.

3. In a combing machine, a feed mechanism, a combing device and a pulling device the combing and pulling devices being independent of the feeding mechanism and moving to and fro conjointly.

4. In a combing machine, a feed mechanism, a combing device and a pulling device, means for moving the feed mechanism and means for moving the combing and pulling devices to and fro conjointly and independently of the feed mechanism.

5. In a combing machine, a feed mechanism moving along an arc of a circle, a comb, a pulling device, and a common single support on which said comb and pulling device are mounted, the said pulling device and comb moving together along an arc of a circle tangential to the arc of circle described by the feed mechanism in its movement.

6. In a combing machine, a feed mechanism, means adapted to impart to said feed mechanism a movement along an arc of a circle, a comb, a pulling device, and a common single support on which said comb and pulling device are mounted and means adapted to impart to the said pulling device and comb a common movement tangential and opposite to the movement of the feed mechanism.

7. In a combing machine, a feed mechanism having a predetermined movement, a combing device, and a pulling device, said devices having conjointly a movement independent of the movement of the feed mechanism, the said movement being in opposite directions to the movement of the feed mechanism.

8. In a combing machine, a moving part having a feed, a second moving part, and combing and pulling devices carried by said second moving part, said parts having alternate angular movements in opposite directions.

9. In a combing machine, a feed mechanism, oscillating beams carrying said mechanism, a combing device, a pulling device, oscillating beams carrying both said combing and pulling devices and means adapted to move the feed mechanism and the pulling device together with the combing device in alternate opposite directions.

10. In a combing machine, a feed mechanism, oscillating beams carrying said mechanism, a combing device, a pulling device, oscillating beams carrying both the combing and pulling devices, a common shaft carrying the oscillating beams and a mechanism actuating said beams.

11. In a combing machine, two feed rollers, means for rotating said rollers, pins covering said rollers and pointing in a direction opposite to the direction of rotation of the rollers, a plate coöperating with said rollers, beams carrying said rollers, means for oscillating said beams, a comb, a pulling device carrying said comb, and beams carrying said pulling device and comb, the said beams being independent of the feed roller beams and oscillated in opposite directions.

12. In a combing machine, a feed mechanism comprising two rollers, means for rotating said rollers, pins covering said rollers and pointing in the opposite direction to the direction of the rotation of the rollers and a plate coöperating with said rollers, beams carrying the said feed mechanism, actuating means adapted to give alternate angular movements to said beams, a comb, the said comb having the form of an arc of a circle, a pulling device, means carrying the said pulling device and comb, and means adapted to give to the beams carrying the pulling device alternate angular movements in a direction opposite to the direction of movement of the beams carrying the feed mechanism.

13. In a combing machine, a feed mechanism comprising two rollers, pins covering said rollers and pointing in the opposite direction to the direction of rotation of the rollers, a plate coöperating with said rollers, beams carrying said feed mechanism, means for oscillating said beams, actuating means for rotating the feed rollers at the end of the downward travel of the said beams, a comb, a pulling device, beams carrying said pulling device and comb, means for oscillating the said beams and means actuating the pulling device during the upward travel of the beams carrying said pulling device substantially as described.

In testimony whereof we have signed our names to this specification in the presence of two subscribing witnesses.

FRANZ SCHMIDT.
CHARLES FREMAUX.

Witnesses:
GREGORY PHELAN,
GEORGE BEILE.